June 13, 1933.  W. J. MISKELLA  1,913,848
ATTACHMENT FOR CAMERAS
Filed March 5, 1931
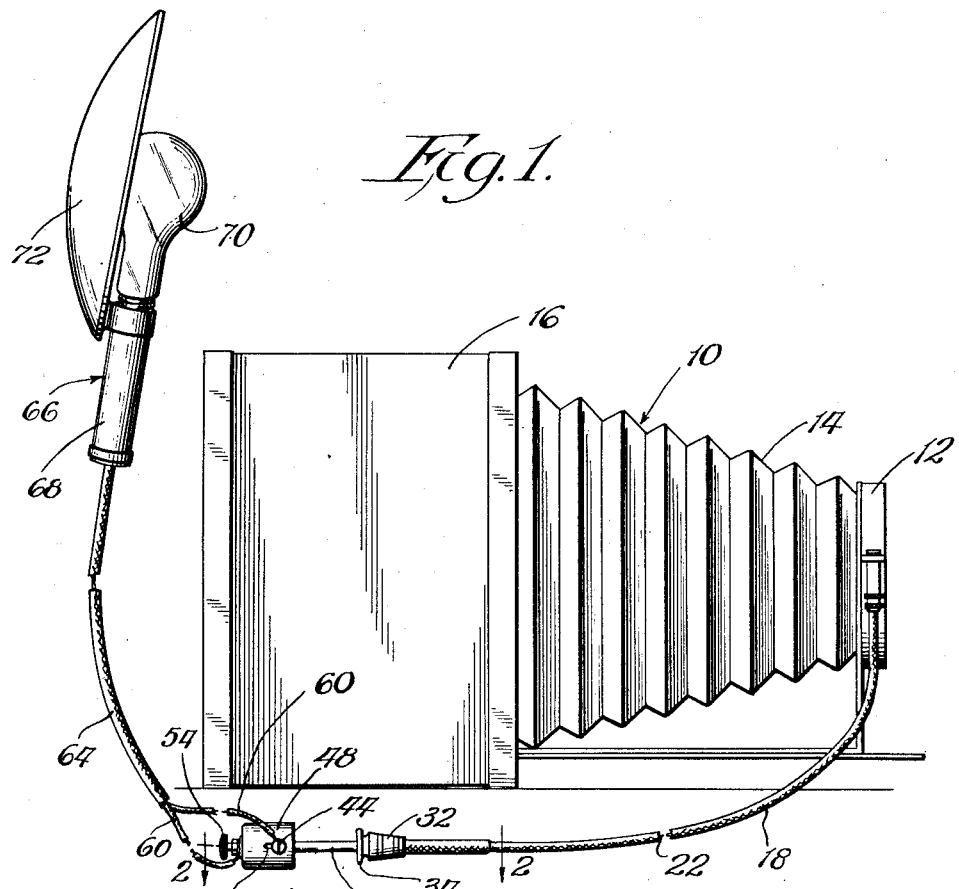
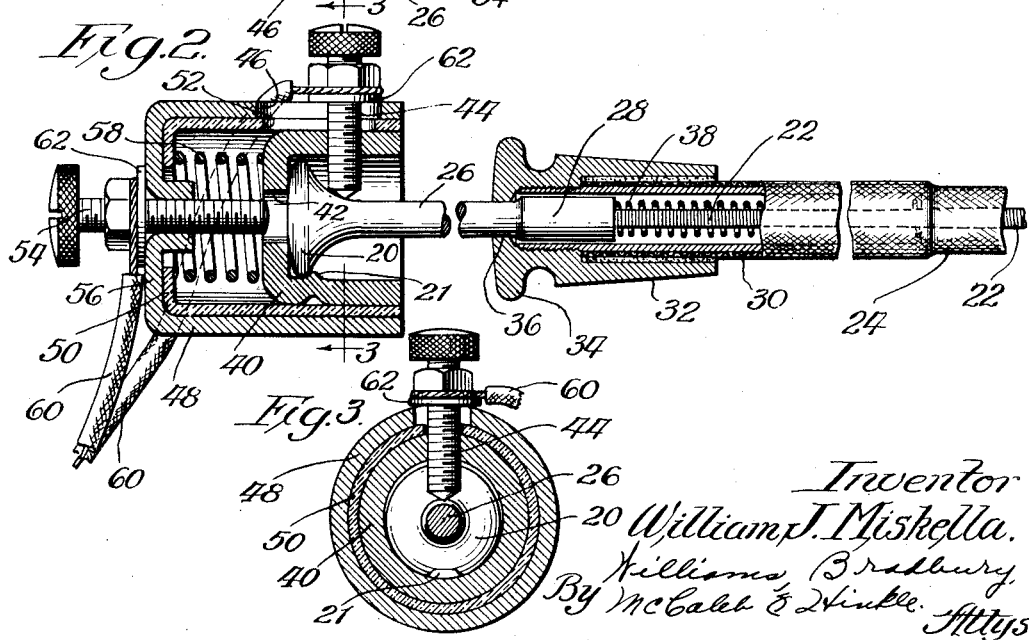

Patented June 13, 1933

1,913,848

UNITED STATES PATENT OFFICE

WILLIAM J. MISKELLA, OF OAK PARK, ILLINOIS

ATTACHMENT FOR CAMERAS

Application filed March 5, 1931. Serial No. 520,302.

My invention relates to an attachment for cameras used for taking flashlight pictures, and has for an object the provision of an improved attachment for the cable release of the camera. My invention is particularly adapted to use with photo flash lamps of the type now extensively used for making flashlight pictures. These lamps generally comprise a battery, an electric light bulb, a reflector, and a switch arranged to be closed after the shutters of a camera have been opened, whereby the battery is connected to the light bulb and a brilliant flash of light is momentarily produced as the filament is burned up.

In the ordinary use of these lamps in connection with the taking of flashlight pictures, it has been the custom to grasp the cable release to the shutters in one hand and the lamp and reflector unit in the other, and first press the button on the end of the cable release to open the shutters, and then press the switch on the lamp unit to close the circuit through the battery to produce the flash. Numerous experiments with the foregoing apparatus have revealed the fact that frequently a photographer will subconsciously press the light switch simultaneously with pressing the cable release button, or even prior to pressing the cable release button, thus producing an insufficiently lighted or a poorly exposed photograph.

The principal object of my invention is to provide a means associated with the shutter control means of a camera for automatically closing the switch of a flash lamp in timed relation to the opening of the camera shutters.

A further object is to provide improved switch means for controlling the flash lamp in accordance with the manipulation of the cable release of a camera.

A further object is to provide improved means of this type adjustable to vary the time interval between the opening of the shutters and the production of the flash.

A further object is to provide a device of this type in the form of a detachable unit capable of attachment to the cable release of any camera.

A further object is the provision of a device that is simple in construction, cheap to manufacture, and that will not easily become broken or injured in use.

Other objects and advantages will be more apparent from the following description taken in connection with the accompanying sheet of drawing, in which Figure 1 is a side elevational view of a photographer's camera with the cable release thereof connected to the switch for turning on the flash lamp;

Figure 2 is an enlarged sectional view through the cable release and switch means, taken generally on the line 2—2 of Fig. 1; and Figure 3 is a vertical sectional view through the switch taken on the line 3—3 of Fig. 2.

In accordance with my invention, I have illustrated an ordinary camera 10, which may comprise a shutter unit 12, a collapsible bellows 14, and a box portion 16, within which the plates to be exposed are normally placed. A cable release 18 of the usual type found on most cameras extends from the shutter 12 and carries at its extended end an operating button 20. In the usual construction of these cable releases, a flexible shaft 22 is provided which extends through a cloth covered conduit 24.

The flexible shaft 22 is secured at its outer end to a rigid stem 26 which is integrally formed with the operating button 20. Stem 26 has an enlarged portion 28 adapted to reciprocate in a tubular member 30 formed in the end of the cloth covered conduit 24. The tubular member 30 is screw-threaded at its outer end to engage a housing 32 formed with a finger manipulating flange 34. Housing 32 has an opening 36 in its end through which stem 26 normally extends, with the portion 28 bearing against the inner edge of opening 36, the stem being pressed rearwardly by a compression spring 38 positioned in the tubular member 30 and bearing against the end of enlarged portion 28 of the stem.

A cap-like member 40 is provided over the button 20, the member having an aperture 42 in its end wall. The button 20 and the cap-like member 40 are arranged to be rigidly locked together by a screw member 44 which is screw-threadedly mounted in the member 40 and frictionally engages button 20. A shoulder 21 formed in the inner wall of member 40 assists in locating and securing these units together. The screw member 44 extends through an elongated slot 46 in a cylindrical housing 48 which encloses the cap-like member 40. An insulating member 50 is disposed between the housing 48 and the cap member 40 to electrically insulate these members from each other. The insulator is also formed with an elongated opening 52 alined with opening 46 of the housing.

A binding post 54 is arranged to be screw-threadedly mounted in an end wall 56 of housing 48. The binding post 54 has its stem extending inwardly toward button 20, in normal use being separated therefrom a slight distance. The binding post, however, is adjustably mounted so that this distance may be varied to suit prevailing conditions. A comparatively strong compression spring 58 is normally disposed between cap member 40 and wall 56 of the housing 48. Both screw member 44 and binding post 54 have attached thereto electric conduits 60, 60. These conduits are suitably insulated from the housing at the binding post 54 and at the screw member 44 by suitable insulating washers 62. Conduits 60, 60 enter a common cable 64 which extends to the flash lamp 66.

The flash lamp 66, which is commonly known in the art, may comprise a battery 68, an electric light bulb 70, and a reflector 72. In the normal use of the flash lamp, a switch is provided which closes a circuit between the battery and the electric light bulb, thereby producing a momentary flash due to the peculiar construction of the electric light bulb, which burns out in producing the flash. Therefore, for each flash produced a new bulb is required, and it is not desirable to close the circuit through the light unless the operator is certain that the shutters of the camera are open.

In the use of my improved switch means, the photographer will grasp the cable release in the normal manner and will press the housing 48 instead of the button 20 forward, as is customary when it is desired to open the shutters to take a photograph. When the photographer presses the housing 48 forward, button 20 is moved forward toward the flange 34, with the result that the shutters are opened. After the flange 34 bears against the end of cap member 40, continued pressure will move the housing 48 forward over cap member 40 against the pressure of spring 58, until the end of button 20 contacts the end of binding post 54, thus completing a circuit through battery 68 and lamp 70 by means of the conduits 60, 60.

Cameras are ordinarily provided with three alternative time period controls. They are "snap shot", "bulb" and "time exposure". For snap shots means are provided whereby, depending on light and other conditions, exposures may be made for one-fifth to one-hundredth of a second. For time exposures, the shutters are snapped open by the release cable upon an operation thereof and snapped shut upon repeating the operation after the desired time interval. For the so-called "bulb" exposure, the shutters are snapped open by an operation of the release cable and allowed to snap shut when pressure is released on the cable release button. This latter "bulb" exposure is the most preferable time control for use with my switch device.

From the above description it will readily be apparent that with the construction shown, it is impossible to operate the lamp switch prior to the opening of the camera shutters, thus insuring against the possibility of wasting lamp bulbs through inadvertently pressing the lamp switch before the shutters are opened, or simultaneous with the opening of the shutters. By the foregoing arrangement, it is possible to accurately control the interval of time between the opening of the shutters and the production of the flash.

While I have illustrated and described a specific embodiment of my invention, it will be apparent to those skilled in the art that numerous changes and modifications may be made from the specific structure shown, and I do not wish to be limited in any particular. Rather, what I desire to secure and protect by Letters Patent of the United States is:

1. A switch means for attachment to the button of a cable release for cameras comprising a cap adapted to be attached to said button, a housing enclosing said cap, said cap being slidably mounted in said housing and insulated therefrom, a binding post on said cap and on said housing, and resilient means normally preventing the closing of a circuit through said binding posts, said binding posts adapted to be electrically connected upon a shutter opening operation of said cable release.

2. A switch means for attachment to the button of a cable release for cameras comprising a cap adapted to be attached to said button, a housing enclosing said cap, said cap being slidably mounted in said housing and insulated therefrom, and an electric circuit normally held open between said cap and said housing and adapted to be closed upon a shutter opening operation of said cable release.

3. A switch means for attachment to the button of a cable release for cameras comprising a member adapted to be attached to said button, a second member slidably mounted on said first member and insulated therefrom, an electrical conductor connected to each of said members, and resilient means normally preventing the closing of an electric circuit through said members except during a shutter opening operation of said cable release.

4. A switch means for attachment to the button of a cable release for cameras, comprising a cylindrical member adapted to be secured to said button, a second member encircling said first member, a binding post mounted in the end of said second member extending to a point adjacent said first member, said second member having an elongated opening in a side wall, a second binding post extending through said opening and frictionally engaging said first member, said members being electrically insulated from each other, and resilient means for normally preventing the closing of a circuit through said binding posts.

5. A switch means for attachment to the button of a cable release for cameras, comprising a cylindrical cap adapted to fit over said button, said cap having an opening in its closed end, a second cap enclosing said first cap, a binding post mounted in the end of said second cap extending into the opening in said first cap to a point adjacent said button, said second cap having an elongated opening in a side wall, a second binding post extending through said opening and frictionally engaging said first cap, said caps being electrically insulated from each other, and resilient means for normally preventing the closing of a circuit through said binding posts caused by said second binding post contacting said button.

6. A switch means for attachment to the button of a cable release for cameras, comprising a cylindrical cap adapted to fit over said button, said cap having an opening in its closed end, a second cap enclosing said first cap, a binding post mounted in the end of said second cap extending into the opening in said first cap, said second cap having an elongated opening in a side wall, a second binding post extending through said opening and frictionally engaging said first cap, said caps electrically insulated from each other, and resilient means for normally holding open a circuit through said binding posts.

In witness whereof, I hereunto subscribe my name this 2nd day of March, 1931.

WILLIAM J. MISKELLA.